US008584102B2

(12) United States Patent
Need et al.

(10) Patent No.: US 8,584,102 B2
(45) Date of Patent: Nov. 12, 2013

(54) CREATING AND USING DELTAS TO MODIFY EXISTING COMPUTER CODE

(75) Inventors: Dwayne Richard Need, Woodinville, WA (US); Varsha Mahadevan, Sammamish, WA (US); Brandon C. Furtwangler, Bothell, WA (US); Tsvetomir V. Valtchev, Bellevue, WA (US); Benjamin Franklin Carter, Redmond, WA (US); Cedric Patrick Dussud, Seattle, WA (US); Karen Elizabeth Corby, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1038 days.

(21) Appl. No.: 11/964,956

(22) Filed: Dec. 27, 2007

(65) Prior Publication Data

US 2009/0172651 A1 Jul. 2, 2009

(51) Int. Cl.
*G06F 9/45* (2006.01)

(52) U.S. Cl.
USPC ............ 717/136; 717/106; 717/140; 717/170

(58) Field of Classification Search
USPC .......................... 717/106–173; 705/7; 704/2–8
See application file for complete search history.

(56) References Cited

U.S. PATENT DOCUMENTS

| | | | | |
|---|---|---|---|---|
| 5,307,498 A * | 4/1994 | Eisen et al. | ............... | 717/158 |
| 6,016,474 A * | 1/2000 | Kim et al. | ................... | 717/125 |
| 6,026,235 A * | 2/2000 | Shaughnessy | ............... | 717/127 |
| 6,071,317 A * | 6/2000 | Nagel | ................... | 717/128 |
| 6,092,037 A * | 7/2000 | Stone et al. | ................... | 704/8 |
| 6,249,907 B1 * | 6/2001 | Carter et al. | ................... | 717/129 |
| 6,263,302 B1 * | 7/2001 | Hellestrand et al. | ............ | 703/17 |
| 6,493,661 B1 * | 12/2002 | White et al. | ................... | 704/8 |
| 6,502,099 B1 * | 12/2002 | Rampy | ................... | 1/1 |
| 6,594,822 B1 * | 7/2003 | Schweitz et al. | ............. | 717/140 |
| 6,948,164 B2 * | 9/2005 | Tinker | ................... | 717/168 |
| 6,957,421 B2 | 10/2005 | Hundt et al. | | |
| 6,968,546 B2 * | 11/2005 | Lueh | ................... | 717/158 |
| 7,086,046 B2 * | 8/2006 | Barsness et al. | ............. | 717/152 |
| 7,114,150 B2 | 9/2006 | Dimpsey et al. | | |
| 7,155,426 B2 | 12/2006 | Al-Azzawe | | |
| 7,231,600 B2 * | 6/2007 | Zhou et al. | ................... | 715/236 |
| 7,293,259 B1 * | 11/2007 | Dmitriev | ................... | 717/130 |

(Continued)

OTHER PUBLICATIONS

Gaisbauer, "Cross-platform IL code manipulation library for runtime instrumentation of .NET applications", dynaTrace software GmbH, Jul. 5, 2007, pp. 1-5.

(Continued)

*Primary Examiner* — Lewis A Bullock, Jr.
*Assistant Examiner* — Francisco Aponte

(57) ABSTRACT

Aspects of the subject matter described herein relate to creating and using deltas to modify existing computer code. In aspects, computer code may be translated into a higher level language to make it easier for a software developer to modify the computer code. The translated computer code may be presented by an editing tool that presents a user interface that allows changes to be made to the translated computer code. A delta engine may then determine a delta that indicates the changes to perform on the existing computer code to create computer code that would result from compiling the translated computer code as changed via the editing tool. Later, this delta may be used to change the existing computer code after it has been loaded to add or change debugging hooks or other features of the computer code.

15 Claims, 6 Drawing Sheets

(56) References Cited

U.S. PATENT DOCUMENTS

| | | | |
|---|---|---|---|
| 7,543,189 B2* | 6/2009 | Fichter et al. | 714/38.14 |
| 7,716,077 B1* | 5/2010 | Mikurak | 705/7.12 |
| 8,069,436 B2* | 11/2011 | Snyder et al. | 717/106 |
| 2002/0002703 A1* | 1/2002 | Baentsch et al. | 717/11 |
| 2003/0079213 A1* | 4/2003 | Cabillic et al. | 717/158 |
| 2003/0149960 A1 | 8/2003 | Inamdar | |
| 2003/0236794 A1* | 12/2003 | Hostetter et al. | 707/101 |
| 2003/0236796 A1* | 12/2003 | Easter et al. | 707/104.1 |
| 2004/0133882 A1* | 7/2004 | Angel et al. | 717/130 |
| 2005/0034109 A1 | 2/2005 | Hamilton et al. | |
| 2005/0039187 A1 | 2/2005 | Avakian et al. | |
| 2006/0136192 A1* | 6/2006 | Wells | 704/2 |
| 2007/0143530 A1* | 6/2007 | Rudelic et al. | 711/103 |
| 2007/0168998 A1* | 7/2007 | Mehta et al. | 717/130 |
| 2007/0226683 A1* | 9/2007 | Stoodley et al. | 717/106 |
| 2011/0035733 A1* | 2/2011 | Horning et al. | 717/140 |

OTHER PUBLICATIONS

"IL modification at runtime (step III)", Jul. 26, 2003, pp. 1-6.

Hanson, et al., "A Machine-Independent Debugger", Software—Practice and Experience, vol. 26, No. 11, Nov. 1996, John Wiley & Sons, Ltd., 1996. pp. 1277-1299.

Mikunov, "Rewrite MSIL Code on the Fly with the .NET Framework Profiling API", Microsoft Corporation, 2007, pp. 1-8.

* cited by examiner

CREATING AND USING DELTAS TO MODIFY EXISTING COMPUTER CODE

BACKGROUND

When computer code is released, it may be released with debugging hooks. Debugging hooks may allow a debugging tool, for example, to be notified when certain events occur. Once the computer code is released, however, adding hooks or changing the available hooks is somewhat cumbersome. For example, because of security reasons, some software vendors sign computer code and build applications that will only work when they are interacting with code having a particular signature. Thus, changing the code to include the additional hooks, repackaging the code for distribution, distributing the updated code, and installing the updated code, besides being work-intensive, may not be sufficient to allow additional debugging of the updated code at a customer site.

SUMMARY

Briefly, aspects of the subject matter described herein relate to creating and using deltas to modify existing computer code. In aspects, computer code may be translated into a higher level language to make it easier for a software developer to modify the computer code. The translated computer code may be presented by an editing tool that presents a user interface that allows changes to be made to the translated computer code. A delta engine may then determine a delta that indicates the changes to perform on the existing computer code to create computer code that would result from compiling the translated computer code as changed via the editing tool. Later, this delta may be used to change the existing computer code after it has been loaded to add or change debugging hooks or other features of the computer code.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
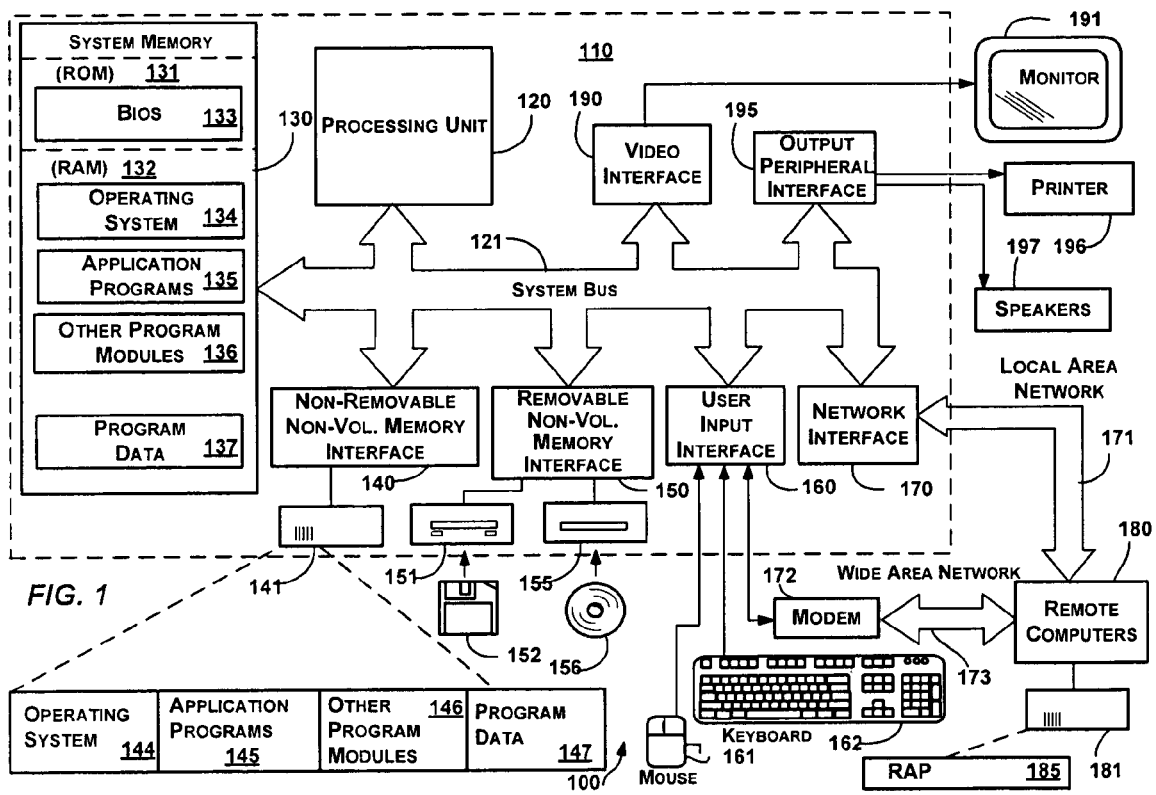
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Deltas and Modifying Computer Code

As mentioned previously, adding debug hooks to already existing computer code may be cumbersome and involve many steps. The term "debug hooks" as used herein is to be read to include any code modification to a first computer code. Such code modifications may include code that allows second computer code to get information or get or set data in the first computer code. For example, a debug hook may add the capability to be notified of an event that occurs in the first computer code. As another example, a debug hook may add the capability to get or set a data element, structure, object, or the like of the first computer code. Aspects of the subject matter described herein are directed to easing the process of modifying existing computer code including the adding, deletion, and/or modifying of features and/or program hooks to existing computer code.

Figure 2:
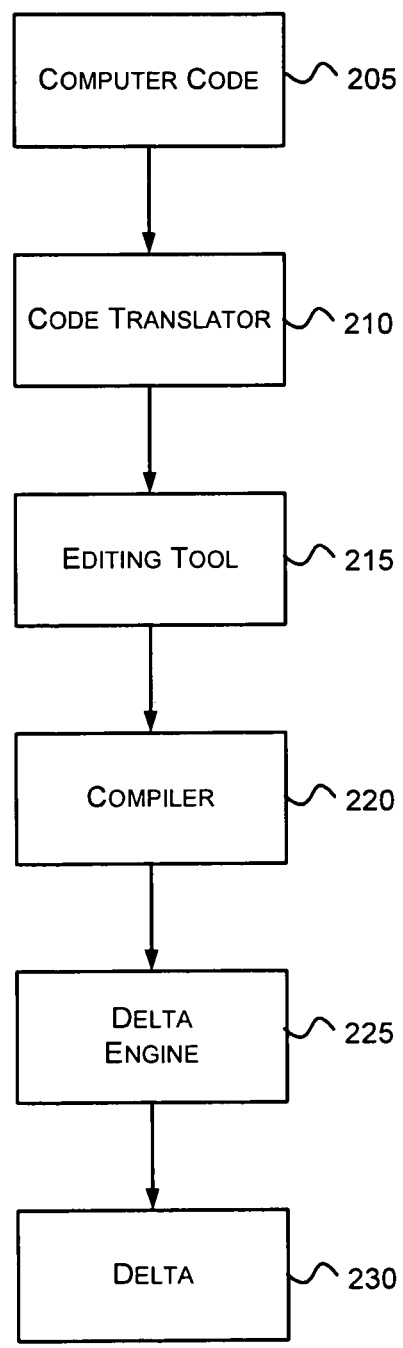
FIG. 2 is a block diagram that generally represents some exemplary entities and objects that may be involved in creating a delta in accordance with aspects of the subject matter described herein.

FIG. 2 is a block diagram that generally represents some exemplary entities and objects that may be involved in creating a delta in accordance with aspects of the subject matter described herein. The computer code 205 includes instructions that indicate the actions a computer is to take. The computer code 205 may also include data, resources, variables, definitions, relationships, associations, and the like that include information other than actions the computer is to take.

The computer code 205 may be included in a subroutine. As defined herein, a subroutine includes a method, a function, a procedure, a section of code that is callable with or without parameters, a section of code that returns or does not return parameters, a section of code with an entry point and an exit point, and the like.

The computer code 205 may be encoded in intermediate language, assembly language, binary code, some combination of the above, and the like.

An intermediate language is a language that is between a language in which a software developer develops computer code and a language used for object or machine code for a computer that will execute the computer code. Sometimes, an intermediate language is used to facilitate portability or optimizations. For example, a company may create a suite of compilers for different programming languages where each compiler compiles computer code written in its corresponding programming language into a common intermediate language.

The computer code 205 is provided to the code translator 210. The code translator 210 uses the computer code 205 and creates corresponding computer code in a higher level language. Just a few exemplary higher level languages include C#, C, C++, Basic, Java®, Pascal, Fortran, assembly language, and Cobol. Those skilled in the art will recognize many other higher level languages. In one embodiment, where the computer code 205 is represented in intermediate language, the code translator 210 creates a higher level language that is often compiled into the intermediate language code. For example, if the computer code 205 is encoded in Java® bytecode, the code translator 210 may decompile the computer code 205 into Java®. As another example, if the computer code is encoded in an intermediate language for use with the NET Framework, the code translator 210 may decompile the computer code 205 into C# or Visual Basic. As yet another example, the binary representation of an intermediate language (e.g., bytecode) may be translated into a human-readable representation (e.g., source code) via disassembly.

The code translator 210 may use any of many techniques in translating the computer code 205 into a higher level language. Some of these techniques include decompiling the computer code 205 and disassembling the computer code 205. Note that decompiling may be used in conjunction with some manual "tweaking" of the code created by the decompilation without departing from the spirit or scope of aspects of the subject matter described herein. Other techniques may involve extracting information from metadata associated with the computer code 205. Other mechanisms of translating the computer code 205 may also be used without departing from the spirit or scope of aspect of the subject matter described herein.

After the code translator 210 has translated the computer code 205 into computer code encoded in a higher level language, this higher level language code is presented to an editing tool 215. In the editing tool 215, a software developer is able to make changes to the code. In editing the code, the software developer may expose, delete, or change hooks, properties, data structures, or other features of the code.

The editing tool 215 may also provide some enhanced editing functions regarding the translated code. For example, the editing tool 215 may allow the developer to indicate actions that are to occur before computer code is executed and/or actions that are to occur after the computer code is executed.

After making changes to the code, the software developer may indicate that a delta is to be created. A delta indicates changes to make to the computer code 205 to modify the computer code 205 so that the changes the software developer has made in the higher level language are reflected in the modified code. As will be described later, in one embodiment, the changes indicated by the delta may be applied after or while the computer code 205 is being loaded into memory. In another embodiment, the delta may be applied before the computer code 205 is loaded into memory and may be persisted to non-volatile storage.

In one embodiment, after the software developer indicates that a delta is to be created, a compiler 220 takes the higher level language representation of the modified computer code and creates code in a lower level language corresponding to the language in which the computer code 205 is written. The delta engine 225 receives this lower level language code and generates a delta 230 of differences between this code and the computer code 205. This delta 230 may then be used to modify the computer code 205 to reflect the changes made with the editing tool 215 using the higher level language.

In one embodiment, the delta engine 225 may operate directly on the source code provided by the editing tool 215 to create the delta 230. For example, in one embodiment, the delta 230 is created without compiling the higher level language into a lower level language. In such an embodiment, the compiler 220 may be omitted.

Furthermore, one or more of the entities indicated in FIG. 2 may be combined with other entities. For example, two or more of the code translator 210, editing tool 215, compiler 220, and delta engine 225 may be combined into a single tool that performs the various functions of the combined entities while presenting a unified interface to a user.

Figure 3:
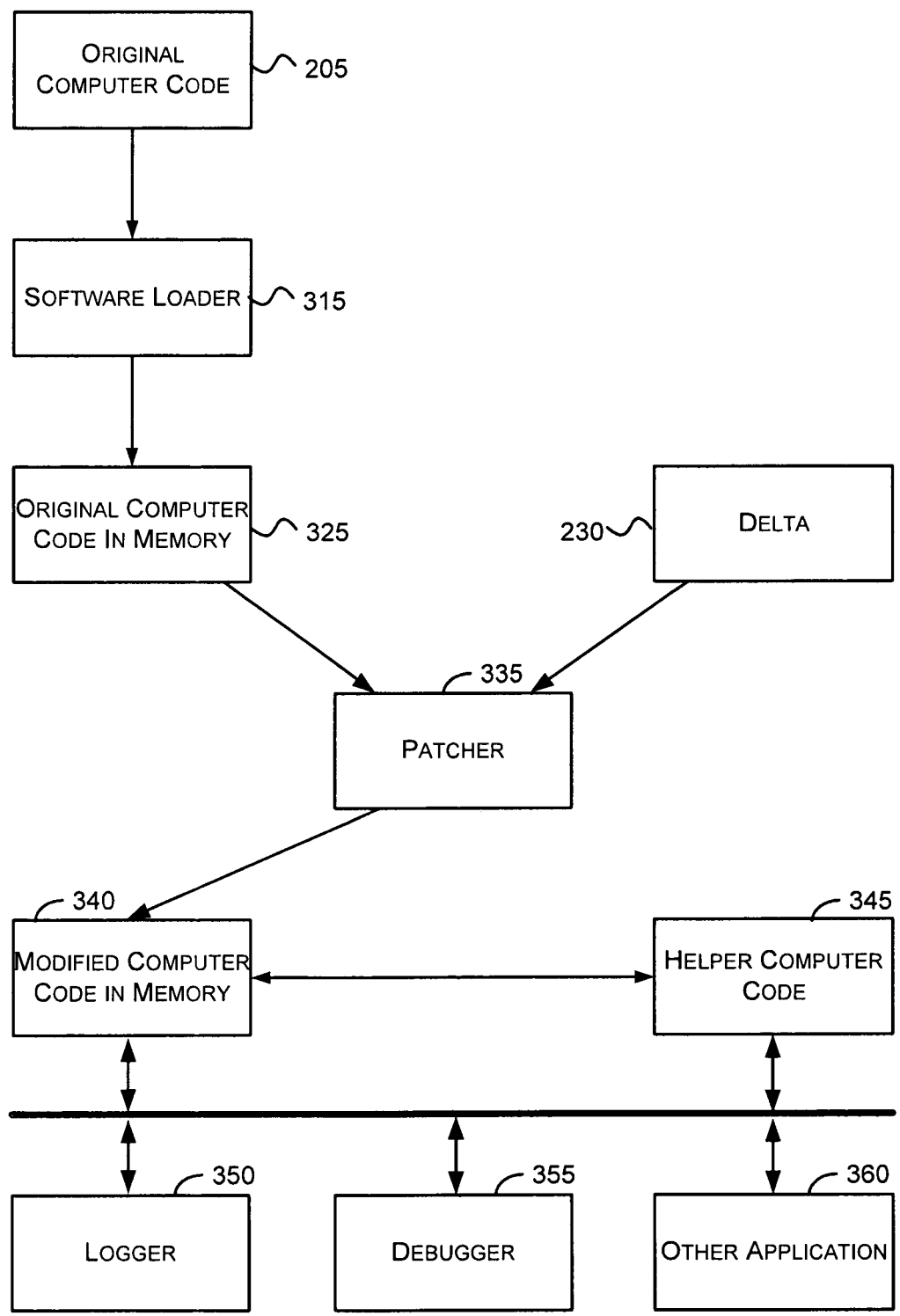
FIG. 3 is a block diagram that generally represents some exemplary entities and objects that may be involved in modifying existing computer code and using the computer code when modified in accordance with aspects of the subject matter described herein.

FIG. 3 is block diagram that generally represents some exemplary entities and objects that may be involved in modifying existing computer code and using the computer code when modified in accordance with aspects of the subject matter described herein. The original computer code 205 may reside in the memory of a computer (e.g., the computer 110 of FIG. 1).

When the computer code 205 is to be executed on a computer, a software loader 315 loads the computer code 205 into main memory. The software loader 315 may be one of many types of software loaders including, for example, a debugger, profiler, dynamic link library loader, general purpose executable loader, intermediate language loader, and the like.

After the software loader 315 has loaded the computer code 205 into main memory, the computer code 325 is more readily available for execution as will be understood by those skilled in the art. In addition, as mentioned previously, computer code may be cryptographically signed. Changing the computer code before loading it into main memory may cause other computer code that interacts with the computer code to reject the modified computer code. Allowing the software loader 315 to load the original computer code 205 into main memory allows standard security mechanisms to verify that the computer code 205 has not been changed. Computer code that will not run unless there is valid cryptographically signed computer code will work properly and not abort if the original computer code 205 is loaded into memory and verified by expected security mechanisms.

Also note that loading the computer code 205 into main memory does not need to occur all at once. Rather portions of the computer code 205 may reside on disk or other nonvolatile storage until they are needed for execution. At the time a particular portion of the code is needed for execution, it may then be loaded into main memory. Memory paging mechanisms may also be employed without departing from the spirit or scope of aspects of the subject matter described herein.

After the original computer code is in memory, at block 325, a tool (herein sometimes called "patcher 335") uses the delta 230 that was created as described in conjunction with FIG. 2 and modifies the computer code in memory. The patcher 335 may comprise, for example, a debugger, a profiler, or some other computer code.

In one embodiment, the software loader 315 and the patcher 335 may be part of the same component with the ability to load the original computer code 205 directly into the modified computer code in memory 340 while applying the delta 230. In another embodiment, the software loader 315 and the patcher 335 may be separate components that communicate with each other to load the original computer code 205 directly into the modified computer code in memory 340.

The modified computer code in memory 340 may be linked to one or more other software including, for example, a logger 350, a debugger 355, and/or other application 360. Note that this linking may occur before or after the patcher 335 has modified the original computer code in memory.

The helper computer code 345 may include interfaces to additional features exposed in the modified computer code in memory 340. When an application links to the modified computer code in memory 340, the application may not be aware of the additional features that are available. This may result for a variety of reasons including that the application may link to the modified computer code in memory 340 before the computer code is modified.

To overcome this obstacle in not being able to access the new features because of not being aware of the new features, the helper computer code 345 may be utilized. In one embodiment, the helper computer code 345 may not be a part of the original computer code. Instead, it may be injected into the modified computer code in memory at run time.

The helper computer code 345 may include application programming interfaces (APIs) that correspond to the new features of the modified computer code in memory 340. These APIs may be "plumbed" to the modified computer code in memory 340 so that when accessed, they turn around and access the new features in the modified computer code and such that when a new event that is exposed in the modified computer code in memory 340 occurs, corresponding code in the helper software code 345 notifies a registered application of the event. An application may link to the helper computer code 345 and may call the helper computer code 345 to access a new feature, activate or deactivate a feature in the computer code 340, or be called or notified by the helper computer code 345 when a newly-exposed event occurs in the modified computer code.

The helper computer code 345 may be coded to interface with the modified computer code in memory 340 as modified, such that the helper computer code 345 is aware of the new features of the modified computer code and is able to call and otherwise interact with the new features of the modified computer code. The helper computer code 345 may be distributed or made available in conjunction with the delta 230.

The logger 350, debugger 355, and/or other application 360 are intended to be exemplary. Indeed, virtually any computer code may link to the modified computer code in memory 340 (before or after it is modified) as well as the helper computer code 345 to gain access to new or changed features in the modified computer code in memory 340.

In one embodiment, the helper computer code 345 may comprise a set of features that are to be made available to an application such as a debugging tool. The application (e.g., one of the logger 350, the debugger 355, or the other application 360) may be coded to strictly access the helper computer code 345 instead of accessing the modified computer code in memory 340. Then, for each computer code that the application is to be used with, a delta may be created that causes the computer code to communicate with the helper computer code 345 to deliver the set of features needed by the helper computer code 345 to deliver the features to the application.

In this manner, the application does not need to be rebuilt for each software program. Instead, the application may access the helper computer code 345 and trust that the helper computer code 345 will have access to the appropriate features in the computer code via a delta built to expose the features in the computer code to the helper computer code 345.

As will be recognized by those skilled in the art, this allows one to develop a debugging platform that is specific to a certain domain. For example, a debugging platform may deal specifically with animation features, database features, inter process communication features, networking features, other features, or the like and may provide a rich visual environment in which to debug these features. To debug a particular computer code, one or more deltas may be created to cause the computer code to interact with the helper computer code 345 as appropriate to provide the information provided by the helper computer code 345.

Figure 4:
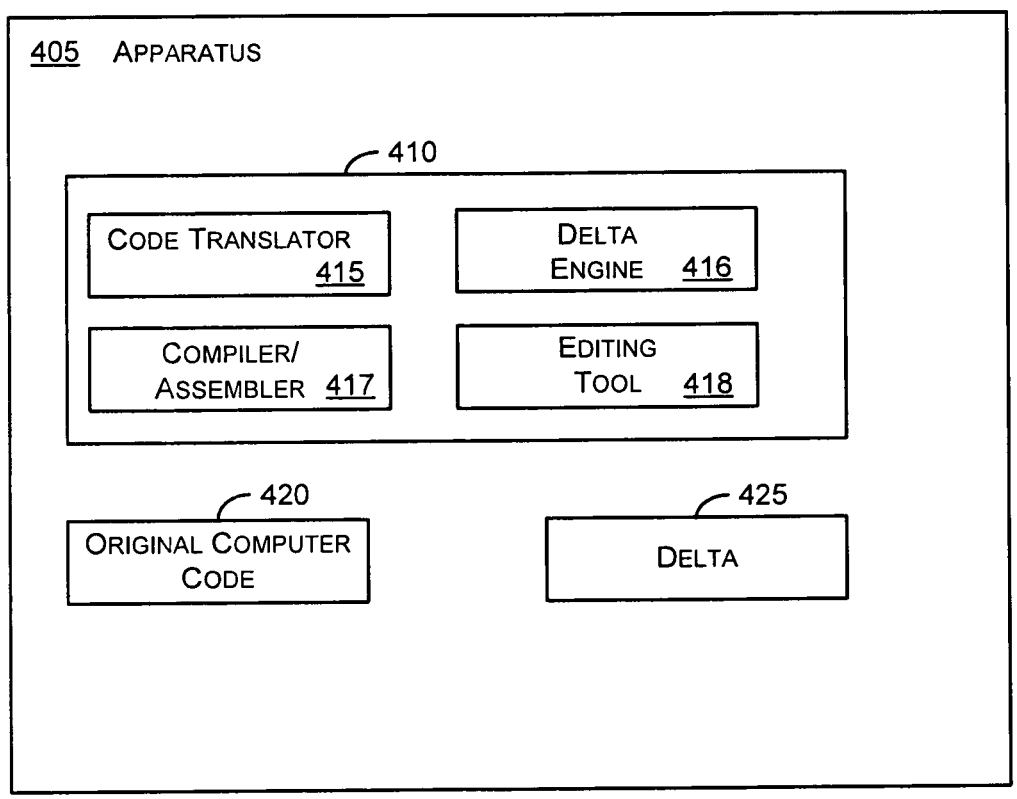
FIG. 4 is a block diagram illustrating various components that may be included in an apparatus arranged in accordance with aspects of the subject matter described herein.

FIG. 4 is a block diagram illustrating various components that may be included in an apparatus arranged in accordance with aspects of the subject matter described herein. The components illustrated in FIG. 4 are exemplary and are not meant to be all-inclusive of components that may be needed or included. In other embodiments, the components or functions described in conjunction with FIG. 4 may be included in other components or placed in subcomponents without departing from the spirit or scope of aspects of the subject matter described herein.

Turning to FIG. 4, the apparatus 405 may include components 410, an original computer code 420, and a delta 425. The components 410 may include a code translator 415, a delta engine 416, a compiler/assembler 417, and an editing tool 418. The apparatus 405 may be implemented as a computer (e.g., the computer 110 of FIG. 1)

The code translator 415 may translate computer code encoded in one computer language to computer code encoded in another computer language. For input, the code translator 415 may use the original computer code 420. The code translator 415 operates similarly to the code translator 210 described in conjunction with FIG. 2 and will not be described in more detail here.

The editing tool 418 allows a software developer to make changes to the translated code generated by the code translator 210. The editing tool 418 operates similarly to the editing tool 215 described in conjunction with FIG. 2 and will not be described in more detail here.

The compiler/assembler 417 (hereinafter referred to as the compiler 417) compiles or assembles computer code encoded in one computer language to a computer code encoded in another computer language. The term compiler/assembler refers to a component that is capable of compiling or assembling or compiling and assembling. Furthermore, wherever the term "compiler" is used in this document outside of the claims, in another embodiment the term "assembler" is to be substituted instead of "compiler." In such embodiments, the term "compiles" and its equivalents is to be replaced with "assembles" or its equivalents. As input the compiler 417 may receive the computer code as edited by the editing tool 418 and may generate other computer code encoded in the computer language of the original computer code 420, for example. The compiler 417 operates similarly to the compiler 220 described in conjunction with FIG. 2 and will not be described in more detail here.

The delta engine 416 generates the delta 425 of differences between one computer code (e.g., the original computer code 420) and the other computer code (e.g., the changed computer code compiled by the compiler 417). As mentioned previously, this may be possible to do without compiling the changed computer code. In such an implementation, the compiler 417 may be omitted. The delta 425 may indicate the changes to make to change the original computer code 420 into a computer code that would result by compiling the changed computer code obtained via the editing tool 418. The delta engine operates similarly to the delta engine 225 of FIG. 2 and will not be described in more detail here.

Figure 5:
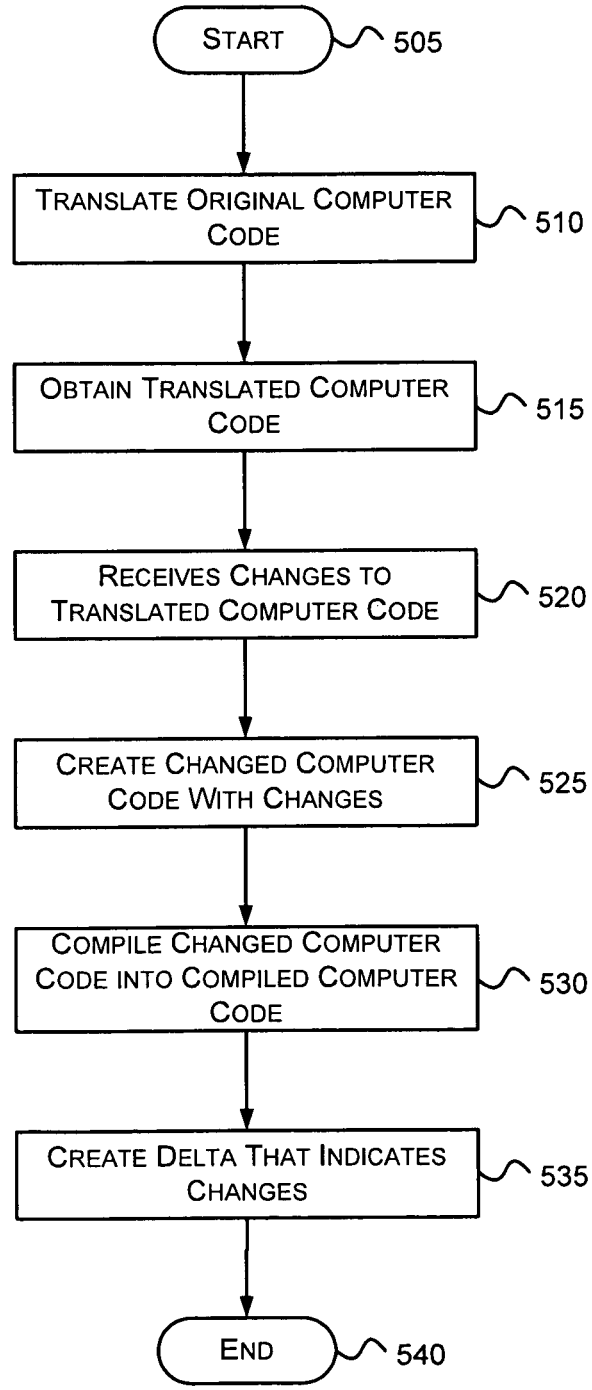
FIGS. 5-6 are flow diagrams that generally represent exemplary actions that may occur in creating and using a delta in accordance with aspects of the subject matter described herein.
Figure 6:
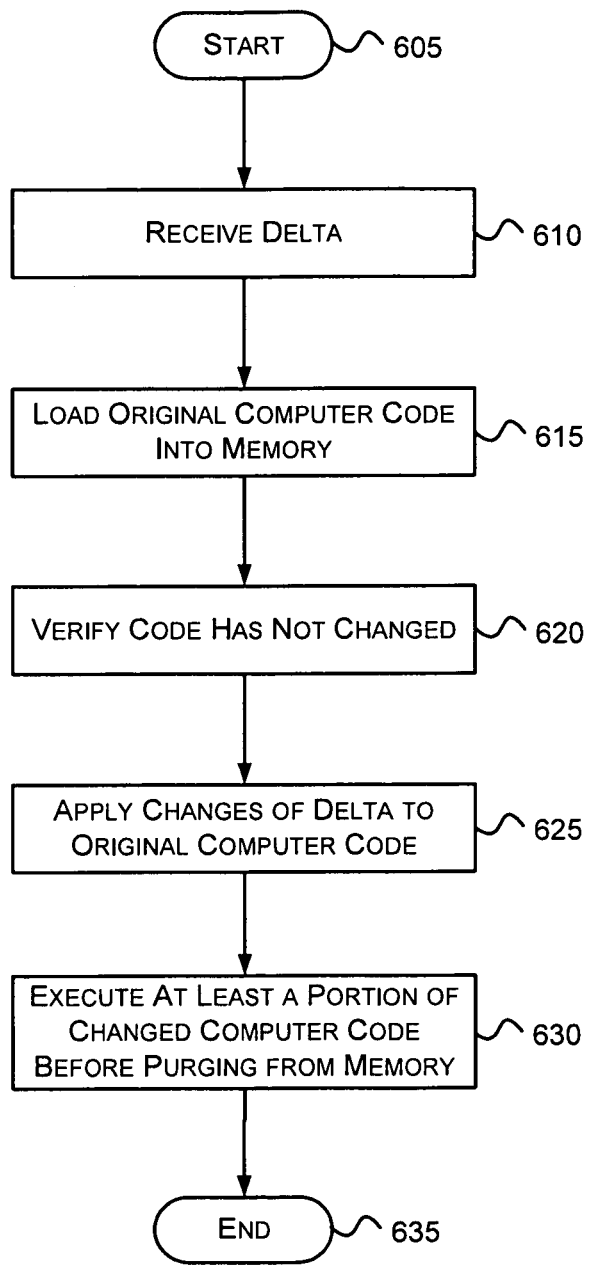

FIGS. 5-6 are flow diagrams that generally represent exemplary actions that may occur in creating and using a delta in accordance with aspects of the subject matter described herein. For simplicity of explanation, the methodology described in conjunction with FIGS. 5-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 5, at block 505, the actions begin. At block 510, the original computer code is translated into a higher level language. For example, referring to FIG. 4, the original computer code 420 may be decompiled by the code translator 415.

At block 515, the translated computer code is obtained by an editing tool. For example, referring to FIG. 4, the editing tool 418 obtains the translated computer code from the code translator 415.

The original computer code may be translated by a component separate from or a part of the environment that includes the editing tool. If the translator is part of the editing tool's environment, obtaining the translated computer code may be as simple as obtaining a pointer to the memory in which the translated computer code resides. If the translator is not part of the editing tool's environment, obtaining the translated computer code may involve obtaining a name of a file that includes the translated computer code, a location at which the translated computer code may be found, or the like.

At block 520, the editing tool receives changes to the translated computer code. For example, referring to FIG. 4, the editing tool 418 may present a user interface that a software developer may use to change the translated computer code. The editing tool 418 may receive these changes from the software developer.

At block 525, a changed computer code is created using the changes. For example, referring to FIG. 4, the editing tool 418 may change the computer code as indicated by the software developer. The computer code as changed may be stored to main memory or non-volatile memory under a different name as desired.

At block 530, the changed computer code is compiled into a compiled computer code. For example, referring to FIG. 4, the compiler 417 may compile the changed computer code into a computer code encoded in the programming language of the original computer code 420, for example. In embodiments where compilation is not needed to create a delta, the actions associated with block 530 may be omitted.

At block 535, a delta is created that indicates changes that need to be made to the original computer code to create the compiled changed computer code. For example, referring to FIG. 4, the delta engine 416 may apply a differencing algorithm to the compiled changed computer code and the original computer code 420 to determine the changes.

Turning to FIG. 6, at block 605, the actions begin. At block 610, a patching tool receives the delta. For example, referring to FIG. 3, the patcher 335 receives the delta 230.

At block 615, the original computer code is loaded into memory. For example, referring to FIG. 3, the software loader 315 loads the original software code 205 into memory.

At block 620, a verification may be performed to determine that the computer code has not changed. For example, referring to FIG. 3, an application may verify that the original software in memory 325 has not changed before linking to the original software in memory. To do this the application may use a security feature associated with the software. One exemplary security feature comprises a cryptographic signature that involves use of the code of the original software in memory to create a signature. Using this signature, another entity can determine whether the code has changed. In light of the teachings contained herein, other mechanisms for ensuring that the software in memory has not changed will be apparent to those skilled in art. Such other mechanisms may also be used without departing from the spirit or scope of aspects of the subject matter described herein.

At block 625, the changes indicated by the delta are applied to the original computer code. For example, referring to FIG. 3, the patcher 335 uses the delta 230 and applies the changes included therein to the original computer code in memory 325. The result is the modified computer code in memory 340. In one embodiment, the delta may be applied at the moment the computer code is about to be executed.

At block 630, at least a portion of the changed computer code is executed before being purged from memory. For example, referring to FIG. 3, an application (e.g., the logger 350, debugger 355, or other application 36) and/or the helper computer code 345 may call a routine in the modified computer code in memory 340.

At block 635, the actions end.

As can be seen from the foregoing detailed description, aspects have been described related to creating and using deltas to modify existing computer code. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer storage media storing computer-executable instructions, which when executed perform actions, comprising:

obtaining a first computer code encoded in a first computer programming language, the first computer code being translated from a second computer code encoded in a second computer language, the first computer programming language being a higher level language than the second computer language;

via a user interface, receiving changes in the first computer programming language to the first computer code, the changes to the first computer code thereby creates a third computer code encoded in the first computer programming language and the changes include inserting helper computer code and new features to the first computer code;

translating the third computer code encoded in the first computer programming language into a fourth computer code encoded in the second computer programming language;

creating a delta that indicates changes in the second computer code of the second computer language by comparing the second computer code to the fourth computer code to identify changes in the second and fourth computer code encoded in the second programming language, the changes comprise actions that are to occur before, during, after, or instead of actions indicated by the first computer code; and linking an application to the fourth computer code to access the new features, the linking comprising:

receiving, at the helper computer code from the application, a call to access a new feature, the helper computer code includes application programming interfaces (API) that correspond to each respective new feature; and in response to the access call, the helper code using the delta to determine which feature's API to invoke for the requesting application without causing the application to be rebuilt.

2. The computer storage media of claim 1, wherein the first computer programming language comprises a language that is higher than machine language and the second computer language comprises a language intermediate to the first computer programming language and machine language.

3. The computer storage media of claim 1, wherein the first computer code being translated from second computer code comprises the first computer code being decompiled from the second computer code.

4. The computer storage media of claim 1, wherein translating the third computer code comprises:

compiling the third computer code into the fourth computer code encoded in the second computer language.

5. The computer storage media of claim 1, wherein the changes comprise providing a notification of an event that was previously not exposed via the second computer code.

6. The computer storage media of claim 1, wherein the changes comprise adding a new data element that was not included in the second computer code and exposing the new data element to external programs.

7. A method implemented at least in part by a computer, the method comprising:

receiving a delta that indicates changes in a first computer language to make to a first computer code that is included inside a subroutine encoded in the first computer language to create a second computer code encoded in the first computer language, the delta created by:

translating the first computer code to a third computer code encoded in a second computer language, which is a higher level language than the first computer language;

via a user interface, receiving modifications in the second computer language to the third computer code, the modifications to the third computer code thereby creates a fourth computer code encoded in the second computer programming language and the modifications include inserting helper computer code and new features to the third computer code;

translating the fourth computer code encoded in the second computer programming language into the second computer code encoded in the first computer programming language;

determining the delta changes in the first computer code of the first computer language by comparing the first computer code to the second computer code to identify changes in the first and second computer code encoded in the first programming language; and linking an application to the second computer code to access the new features, the linking comprising:

receiving, at the helper computer code from the application, a call to access a new feature, the helper computer code includes application programming interfaces (API) that correspond to each respective new feature; and in response to the access call, the helper code using the delta to determine which feature's API to invoke for the requesting application without causing the application to be rebuilt;

after the delta is created, loading the first computer code into memory;

applying the changes in the first computer language to the first computer code to create the second computer code encoded in the first computer language that resides in the memory;

executing at least a portion of the second computer code prior to purging the second computer code from memory;

loading a fifth computer code into memory, the fifth computer code having code to access features provided by the changes, the fifth computer code having other code to provide access to these features to a sixth computer code structured to use the first computer code only if a security feature associated with the first computer code indicates that the first computer code has not changed since the security feature was associated with the first computer code.

8. The method of claim 7, wherein translating the first computer code to the third computer code comprises decompiling the first computer code to obtain the third computer code.

9. The method of claim 7, wherein loading the first computer code into memory comprises loading the first computer code via a profiler and wherein applying the changes to the first computer code to create a second computer code that also resides in the memory comprises the profiler applying the changes.

10. The method of claim 7, wherein executing at least a portion of the second computer code comprises sending a notification of an event from the second computer code, the event existing in the first computer code but code for sending the notification not existing in the first computer code.

11. The method of claim 7, wherein the delta comprises a set of intermediate language modifications to make to the first computer code to create the second computer code.

12. A computer storage media storing computer-executable instructions comprising:
- a code translator operable to translate a first computer code encoded in a first computer language into a second computer code encoded in a second computer language, which is a higher level language than the first computer language;
- an editing tool operable to generate a user interface capable of accepting changes in the second computer language to the second computer code, the changes to the second computer code thereby creates a third computer code encoded in the second computer programming language and the changes include inserting helper computer code and new features to the second computer code;
- a compiler/assembler operable to compile/assemble the third computer code as changed via the editing tool in the second computer language into a fourth computer code encoded in the first computer language; and
- a delta engine operable to generate a delta that indicates changes in the first computer code of the first computer language by comparing the first computer code to the fourth computer code to identify changes in the first and fourth computer code encoded in the first programming language; and
- helper computer code operable to link an application to the fourth computer code to access the new features, the helper computer code structured to:
  - receive, at the helper computer code from the application, a call to access a new feature, the helper computer code includes application programming interfaces (API) that correspond to each respective new feature; and
  - in response to the access call, use the delta to determine which feature's API to invoke for the requesting application without causing the application to be rebuilt.

13. The computer storage media of claim 12, wherein the code translator translates the first computer code into the second computer code by decompiling the first computer code.

14. The computer storage media of claim 13, wherein the second computer language comprises a language that is higher than machine code and the first computer language comprises a language intermediate to the higher level language and the machine code.

15. The computer storage media of claim 13, wherein the changes comprise providing access to register for notification of an event included but not exposed in the first computer code.

* * * * *